(No Model.)
O. BRAUN.
POWER TRANSMITTING DEVICE.
No. 466,114. Patented Dec. 29, 1891.
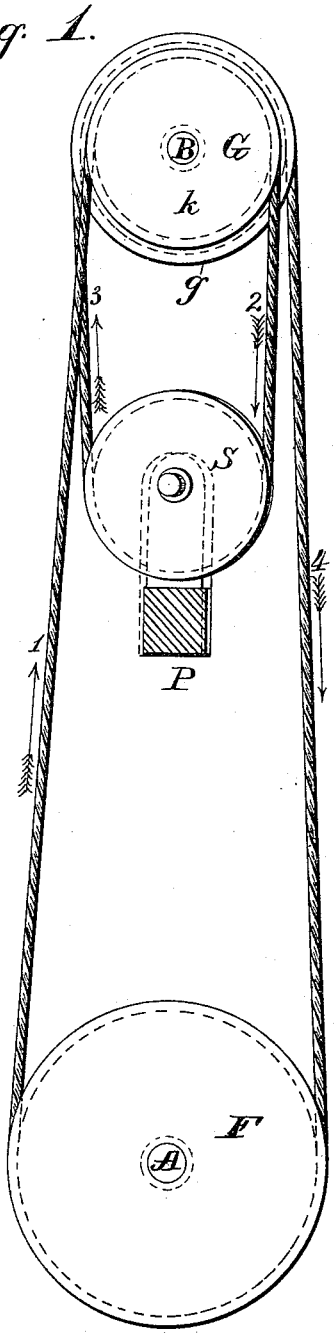
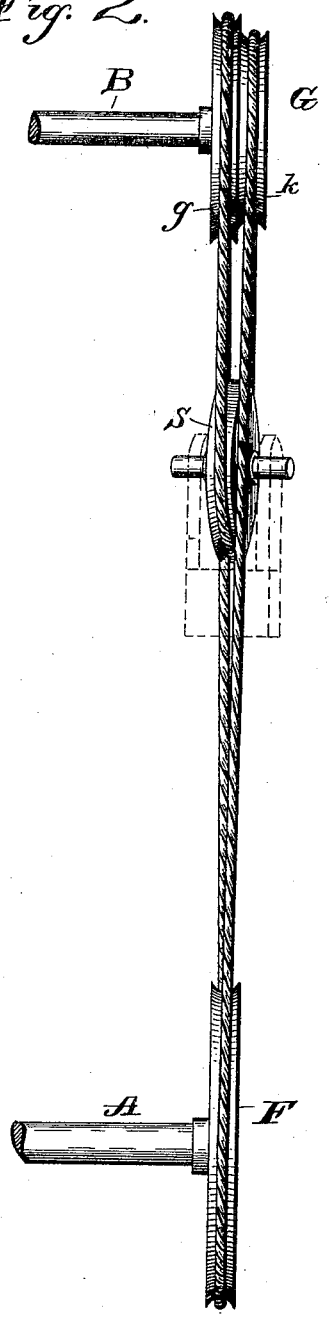
Witnesses:
Percy C. Bower
J. E. Wilson
Inventor:
Otto Braun,
By Whitman & Wilkinson
Attorneys.
THE NORRIS PETERS CO., PHOTO-LITHO., WASHINGTON, D. C.

United States Patent Office.

OTTO BRAUN, OF BERLIN, GERMANY.

POWER-TRANSMITTING DEVICE.

SPECIFICATION forming part of Letters Patent No. 466,114, dated December 29, 1891.

Application filed July 17, 1891. Serial No. 399,885. (No model.)

*To all whom it may concern:*

Be it known that I, OTTO BRAUN, of Berlin, in the Kingdom of Prussia and German Empire, have invented a new and useful Improved System of Rope-Drives, of which the following is a specification, reference being had therein to the accompanying drawings.

My invention relates to power-transmitting devices and especially those devices for transmitting power by flexible ropes or bands; and it consists of the certain novel features hereinafter described and claimed.

In order to convey power from one shaft to another by means of ropes, it often happens, especially when the object is to obtain increased speed, that a single wrapping of the pulleys is not sufficient, and it is customary under such circumstances to use a pulley with several sheaves. For well-known reasons the utmost care has to be taken to obtain an equal diameter for all sheaves of the same block and to preserve an equal tension in all ropes. In order to obviate this, I provide a device in which the two sheaves form one and the same pulley, over both of which the same rope runs, which sheaves are not of the same size. This device must be so arranged that the larger sheave on the driven shaft must be that from which the rope runs to the driving-shaft. The diameter of the larger sheave must bear the same proportion to that of the smaller as the length of the unit-weight of the taut rope bears to the length of the unit-weight of the slack. Supposing that the slack part of the rope increases in length, owing to the difference in tension of the two parts of the rope, to the extent of one-tenth, the ratios of the diameters and consequently the circumferences of the sheaves must be as 10 to 11, so that a length represented by 10 units of the slack-band may run on the smaller sheave at the same time that a length 11 of the taut band runs on the larger sheave.

Reference is had to the accompanying drawings, wherein—

Figure 1 represents a section of the power-transmitting device across the shafts, and Fig. 2 represents a vertical projection on the plane containing the axes of the shafting.

On the shaft A is the single driving-pulley F, and vertically over it on the shaft B is the pulley G, with two sheaves $k$ and $g$. Between pulleys F and G hangs the tension-pulley S, the surface of which is turned toward B, according as the rope guides it. The loading-weight P of the guiding-wheel is, for convenience, only indicated in Fig. 1. The driving motion takes place in the direction indicated by the arrows 1 2 3 4. A reversal of the motion is not admissible. The portion 1 of the rope is the slack. 4 is the taut. The parts 2 and 3, inasmuch as the tension-pulley gives no power, have nearly equal tension, and consequently are stretched less than 4 and more than 1. The relative diameters of the sheaves $g$ and $k$ depend upon the amount of stretch (caused by the inequality of the tension) and must be determined for each kind of rope by experiment.

What I claim, and desire to secure by Letters Patent of the United States, is—

In a device for transmitting power by means of flexible ropes or bands, the combination, with a driving-pulley, of a smaller driven pulley having two sheaves rigidly secured together and secured on a driven shaft, the said sheaves differing in diameter in proportion to the stretch of the rope, and a tension-pulley interposed between the said two sheaves of the driven pulley, substantially as described.

In witness whereof I have hereunto set my hand in presence of two witnesses.

OTTO BRAUN.

Witnesses:
 W. BINDEWALD,
 W. SCHWIETHAL.